United States Patent
Gurudath et al.

(10) Patent No.: US 11,960,758 B2
(45) Date of Patent: Apr. 16, 2024

(54) STORAGE SYSTEM AND FOLDING METHOD FOR ENHANCED PERFORMANCE

(71) Applicant: Western Digital Technologies, Inc., San Jose, CA (US)

(72) Inventors: Bhanushankar Doni Gurudath, Bangalore (IN); Harish Gajula, Bangalore (IN)

(73) Assignee: Western Digital Technologies, Inc., San Jose, CA (US)

(*) Notice: Subject to any disclaimer, the term of this patent is extended or adjusted under 35 U.S.C. 154(b) by 182 days.

(21) Appl. No.: 17/714,328

(22) Filed: Apr. 6, 2022

(65) Prior Publication Data
US 2023/0325105 A1    Oct. 12, 2023

(51) Int. Cl.
*G06F 3/06* (2006.01)
(52) U.S. Cl.
CPC .......... *G06F 3/0655* (2013.01); *G06F 3/0604* (2013.01); *G06F 3/0679* (2013.01)
(58) Field of Classification Search
CPC ................................................... G06F 3/0604
See application file for complete search history.

(56) References Cited

U.S. PATENT DOCUMENTS

| | | | |
|---|---|---|---|
| 8,281,061 B2 | 10/2012 | Radke et al. | |
| 8,468,294 B2 | 6/2013 | Huang et al. | |
| 9,778,863 B2 | 10/2017 | Agarwal et al. | |
| 9,858,009 B2 | 1/2018 | Bhalerao et al. | |
| 10,430,108 B2 | 10/2019 | Natarajan et al. | |
| 2013/0031430 A1* | 1/2013 | Sharon | G06F 11/1048 714/719 |
| 2019/0095116 A1* | 3/2019 | Igahara | G06F 3/0604 |
| 2019/0354478 A1* | 11/2019 | Kashyap | G06F 11/1072 |
| 2022/0076767 A1* | 3/2022 | Guo | G11C 16/24 |

* cited by examiner

*Primary Examiner* — David Yi
*Assistant Examiner* — Nicholas A. Paperno
(74) *Attorney, Agent, or Firm* — Crowell & Moring LLP (57) ABSTRACT

Rather than use one long folding operation to fold data from single-level cell (SLC) blocks into a multi-level cell (MLC) block, a storage system uses a multi-stage folding operation. By breaking up the folding process into stages, SLC blocks involved in an earlier stage can be released prior to a subsequent stage being performed. This can increase performance of the storage system by releasing SLC source blocks sooner and reducing an SLC block budget requirement.

20 Claims, 9 Drawing Sheets

STORAGE SYSTEM AND FOLDING METHOD FOR ENHANCED PERFORMANCE

BACKGROUND

Memory in a storage system can contain single-level cell (SLC) blocks that store one bit per memory cell and multi-level cell (MLC) blocks that can store more than one bit per memory cell. For example, triple-level cell (TLC) blocks can store three bits per memory cell, and quad-level cell (QLC) blocks can store four bits per memory cell. Because MLC blocks typically take longer to program than SLC blocks and to provide protection against defects that can occur when writing to MLC blocks, data from a host can be written first to SLC blocks and then moved ("folded") into an MLC block. For example, after three SLC blocks have been written, they can be folded into a single TLC block. Similarly, after four SLC blocks have been written, they can be folded into a single QLC block. After the data has been written in the MLC block, the storage system can perform an enhanced post-write read (EPWR) operation to determine if the data was written correctly in the MLC block. If it was, then the storage system can release the SLC blocks, so they can be used to store other data.

DETAILED DESCRIPTION

The following embodiments generally relate to a storage system and folding method for enhanced performance and improved yield. In one embodiment, a storage system is presented comprising a memory and a controller. The memory comprises a plurality of single-level cell (SLC) blocks and a multi-level cell (MLC) block. The controller is configured to fold data stored in the plurality of SLC blocks into the MLC block using a multi-stage process. In a first stage of the multi-stage process, a first subset of the plurality of SLC blocks is folded into a first subset of pages of the MLC block. In a second stage of the multi-stage process, a second subset of the plurality of SLC blocks is folded into a second subset of pages of the MLC block. The second stage is performed without reading data written in the first stage and writing it back in the second stage, and the first subset of the plurality of SLC blocks is released between the first and second stages.

In another embodiment, a method is provided comprising: determining how many SLC blocks are available for folding; and in response to determining that two SLC blocks are available for folding: determining whether lower and middle pages of the QLC block have been programmed; in response to determining that the lower and middle pages of the QLC block have not been programmed, programming the lower and middle pages of the QLC block with the two SLC blocks and then releasing the two SLC blocks before upper and top pages of the QLC block are programmed; and in response to determining that the lower and middle pages of the QLC block have been programmed, programming the upper and top pages of the QLC block with the two SLC blocks.

In yet another embodiment, a storage system is provided comprising a memory comprising a plurality of single-level cell (SLC) blocks and a multi-level cell (MLC) block and means for folding data stored in the plurality of SLC blocks into the MLC block using a multi-stage process. In a first stage of the multi-stage process, a first subset of the plurality of SLC blocks is folded into a first subset of pages of the MLC block. In a second stage of the multi-stage process, a second subset of the plurality of SLC blocks is folded into a second subset of pages of the MLC block. The second stage is performed without reading data written in the first stage and writing it back in the second stage, and the first subset of the plurality of SLC blocks is released between the first and second stages. Other embodiments are provided and can be used alone or in combination.

Figures 1A, 1B:
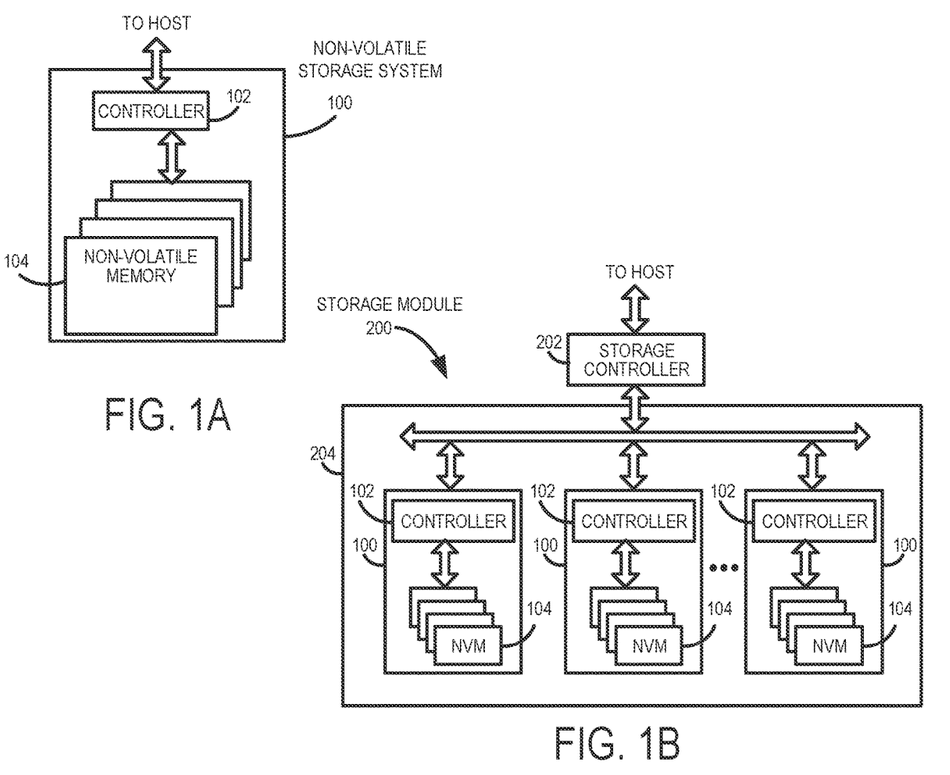
FIG. 1A is a block diagram of a non-volatile storage system of an embodiment.
FIG. 1B is a block diagram illustrating a storage module of an embodiment.
Figure 1C:
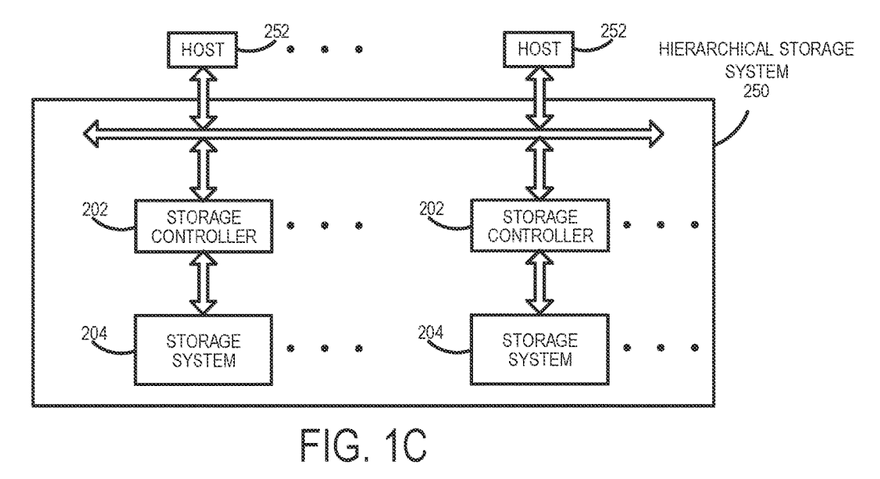
FIG. 1C is a block diagram illustrating a hierarchical storage system of an embodiment.

Turning now to the drawings, storage systems suitable for use in implementing aspects of these embodiments are shown in FIGS. 1A-IC. FIG. 1A is a block diagram illustrating a non-volatile storage system 100 (sometimes referred to herein as a storage device or just device) according to an embodiment of the subject matter described herein. Referring to FIG. 1A, non-volatile storage system 100 includes a controller 102 and non-volatile memory that may be made up of one or more non-volatile memory die 104. As used herein, the term die refers to the collection of non-volatile memory cells, and associated circuitry for managing the physical operation of those non-volatile memory cells, that are formed on a single semiconductor substrate. Controller 102 interfaces with a host system and transmits command sequences for read, program, and erase operations to non-volatile memory die 104.

The controller 102 (which may be a non-volatile memory controller (e.g., a flash, resistive random-access memory (ReRAM), phase-change memory (PCM), or magneto-resistive random-access memory (MRAM) controller)) can take the form of processing circuitry, a microprocessor or processor, and a computer-readable medium that stores computer-readable program code (e.g., firmware) executable by the (micro)processor, logic gates, switches, an application specific integrated circuit (ASIC), a programmable logic controller, and an embedded microcontroller, for example. The controller 102 can be configured with hardware and/or firmware to perform the various functions described below and shown in the flow diagrams. Also, some of the components shown as being internal to the controller can also be stored external to the controller, and other components can be used. Additionally, the phrase "operatively in communication with" could mean directly in communication with or indirectly (wired or wireless) in communication with through one or more components, which may or may not be shown or described herein.

As used herein, a non-volatile memory controller is a device that manages data stored on non-volatile memory and communicates with a host, such as a computer or electronic device. A non-volatile memory controller can have various functionality in addition to the specific functionality described herein. For example, the non-volatile memory controller can format the non-volatile memory to ensure the memory is operating properly, map out bad non-volatile memory cells, and allocate spare cells to be substituted for future failed cells. Some part of the spare cells can be used to hold firmware to operate the non-volatile memory controller and implement other features. In operation, when a host needs to read data from or write data to the non-volatile memory, it can communicate with the non-volatile memory controller. If the host provides a logical address to which data is to be read/written, the non-volatile memory controller can convert the logical address received from the host to a physical address in the non-volatile memory. (Alternatively, the host can provide the physical address.) The non-volatile memory controller can also perform various memory management functions, such as, but not limited to, wear leveling (distributing writes to avoid wearing out specific blocks of memory cells that would otherwise be repeatedly written to) and garbage collection (after a block is full, moving only the valid pages of data to a new block, so the full block can be erased and reused). Also, the structure for the "means" recited in the claims can include, for example, some or all of the structures of the controller described herein, programmed or manufactured as appropriate to cause the controller to operate to perform the recited functions.

Non-volatile memory die 104 may include any suitable non-volatile storage medium, including ReRAM, MRAM, PCM, NAND flash memory cells and/or NOR flash memory cells. The memory cells can take the form of solid-state (e.g., flash) memory cells and can be one-time programmable, few-time programmable, or many-time programmable. The memory cells can also be single-level cells (SLC), multiple-level cells (MLC), triple-level cells (TLC), quad-level cell (QLC) or use other memory cell level technologies, now known or later developed. Also, the memory cells can be fabricated in a two-dimensional or three-dimensional fashion.

The interface between controller 102 and non-volatile memory die 104 may be any suitable flash interface, such as Toggle Mode 200, 400, or 800. In one embodiment, storage system 100 may be a card-based system, such as a secure digital (SD) or a micro secure digital (micro-SD) card (or USB, SSD, etc.). In an alternate embodiment, storage system 100 may be part of an embedded storage system.

Although, in the example illustrated in FIG. 1A, non-volatile storage system 100 (sometimes referred to herein as a storage module) includes a single channel between controller 102 and non-volatile memory die 104, the subject matter described herein is not limited to having a single memory channel. For example, in some storage system architectures (such as the ones shown in FIGS. 1B and 1C), 2, 4, 8 or more memory channels may exist between the controller and the memory device, depending on controller capabilities. In any of the embodiments described herein, more than a single channel may exist between the controller and the memory die, even if a single channel is shown in the drawings.

FIG. 1B illustrates a storage module 200 that includes plural non-volatile storage systems 100. As such, storage module 200 may include a storage controller 202 that interfaces with a host and with storage system 204, which includes a plurality of non-volatile storage systems 100. The interface between storage controller 202 and non-volatile storage systems 100 may be a bus interface, such as a serial advanced technology attachment (SATA), peripheral component interconnect express (PCIe) interface, or double-data-rate (DDR) interface. Storage module 200, in one embodiment, may be a solid-state drive (SSD), or non-volatile dual in-line memory module (NVDIMM), such as found in server PC or portable computing devices, such as laptop computers, and tablet computers.

FIG. 1C is a block diagram illustrating a hierarchical storage system. A hierarchical storage system 250 includes a plurality of storage controllers 202, each of which controls a respective storage system 204. Host systems 252 may access memories within the storage system via a bus interface. In one embodiment, the bus interface may be a Non-Volatile Memory Express (NVMe) or fiber channel over Ethernet (FCoE) interface. In one embodiment, the system illustrated in FIG. 1C may be a rack mountable mass storage system that is accessible by multiple host computers, such as would be found in a data center or other location where mass storage is needed.

Figure 2A:
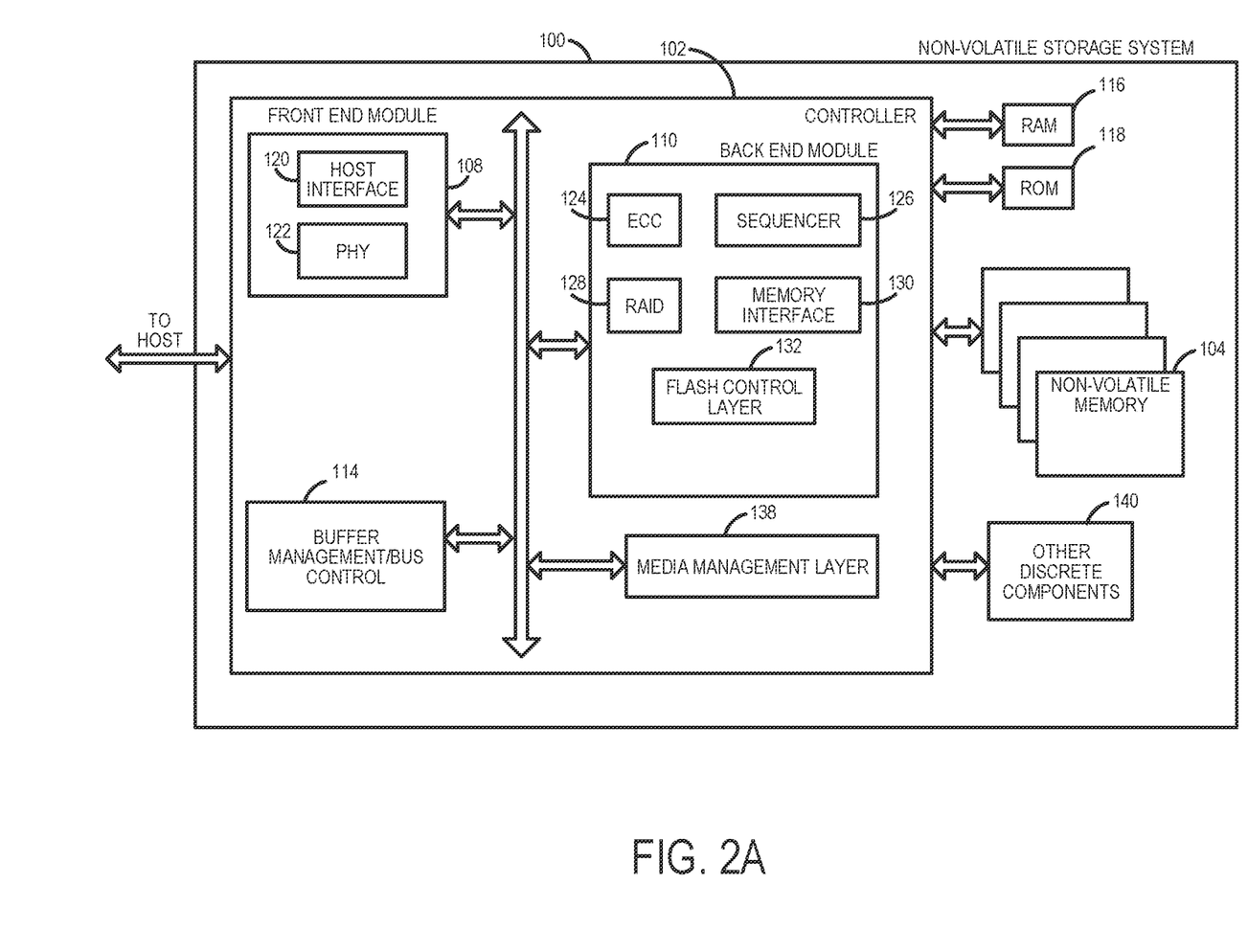
FIG. 2A is a block diagram illustrating components of the controller of the non-volatile storage system illustrated in FIG. 1A according to an embodiment.

FIG. 2A is a block diagram illustrating components of controller 102 in more detail. Controller 102 includes a front end module 108 that interfaces with a host, a back end module 110 that interfaces with the one or more non-volatile memory die 104, and various other modules that perform functions which will now be described in detail. A module may take the form of a packaged functional hardware unit designed for use with other components, a portion of a program code (e.g., software or firmware) executable by a (micro)processor or processing circuitry that usually performs a particular function of related functions, or a self-contained hardware or software component that interfaces with a larger system, for example. The controller 102 may sometimes be referred to herein as a NAND controller or a flash controller, but it should be understood that the controller 102 can be used with any suitable memory technology, example of some of which are provided below.

Referring again to modules of the controller 102, a buffer manager/bus controller 114 manages buffers in random access memory (RAM) 116 and controls the internal bus arbitration of controller 102. A read only memory (ROM) 118 stores system boot code. Although illustrated in FIG. 2A as located separately from the controller 102, in other embodiments one or both of the RAM 116 and ROM 118 may be located within the controller. In yet other embodiments, portions of RAM and ROM may be located both within the controller 102 and outside the controller.

Front end module 108 includes a host interface 120 and a physical layer interface (PHY) 122 that provide the electrical interface with the host or next level storage controller. The choice of the type of host interface 120 can depend on the type of memory being used. Examples of host interfaces 120 include, but are not limited to, SATA, SATA Express, serially attached small computer system interface (SAS), Fibre Channel, universal serial bus (USB), PCIe, and NVMe. The host interface 120 typically facilitates transfer for data, control signals, and timing signals.

Back end module 110 includes an error correction code (ECC) engine 124 that encodes the data bytes received from the host, and decodes and error corrects the data bytes read from the non-volatile memory. A command sequencer 126 generates command sequences, such as program and erase command sequences, to be transmitted to non-volatile memory die 104. A RAID (Redundant Array of Independent Drives) module 128 manages generation of RAID parity and recovery of failed data. The RAID parity may be used as an additional level of integrity protection for the data being written into the memory device 104. In some cases, the RAID module 128 may be a part of the ECC engine 124. A memory interface 130 provides the command sequences to non-volatile memory die 104 and receives status information from non-volatile memory die 104. In one embodiment, memory interface 130 may be a double data rate (DDR) interface, such as a Toggle Mode 200, 400, or 800 interface. A flash control layer 132 controls the overall operation of back end module 110.

The storage system 100 also includes other discrete components 140, such as external electrical interfaces, external RAM, resistors, capacitors, or other components that may interface with controller 102. In alternative embodiments, one or more of the physical layer interface 122, RAID module 128, media management layer 138 and buffer management/bus controller 114 are optional components that are not necessary in the controller 102.

Figure 2B:
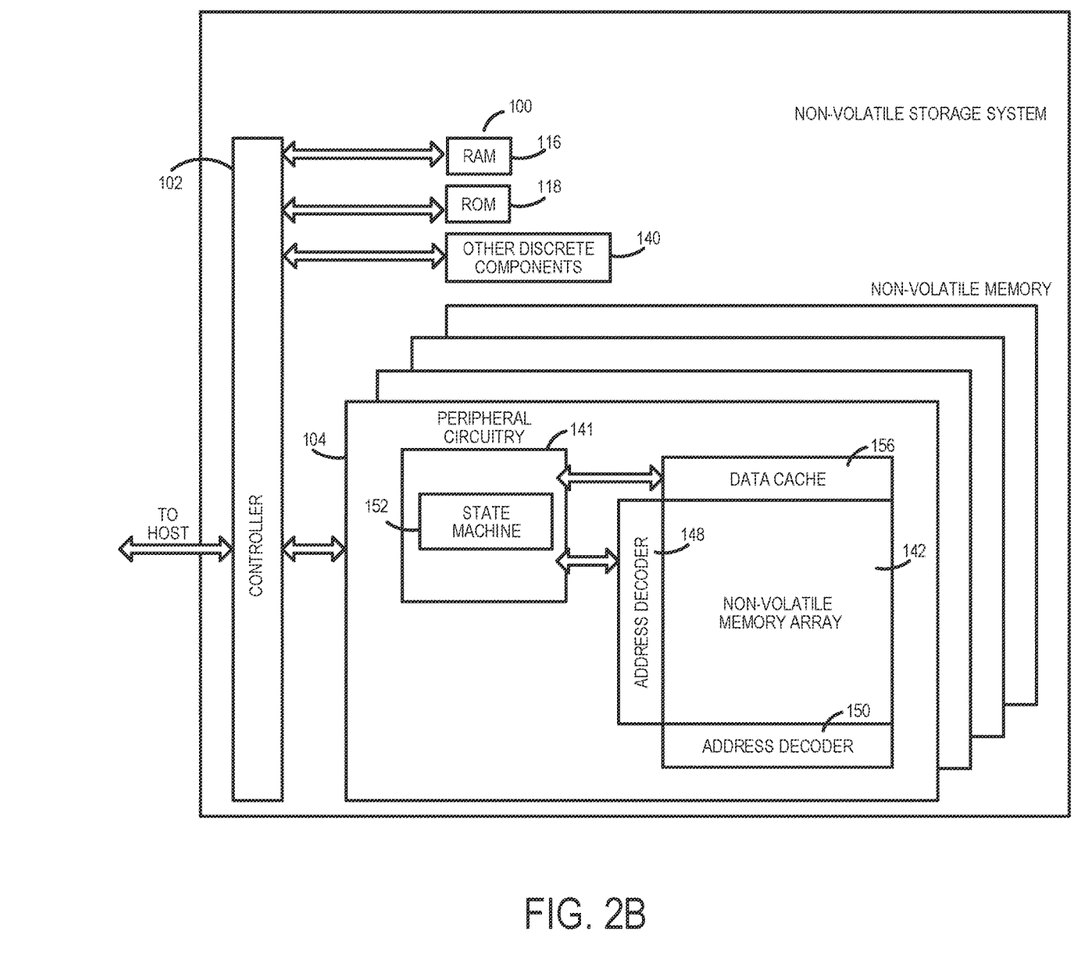
FIG. 2B is a block diagram illustrating components of the non-volatile storage system illustrated in FIG. 1A according to an embodiment.

FIG. 2B is a block diagram illustrating components of non-volatile memory die 104 in more detail. Non-volatile memory die 104 includes peripheral circuitry 141 and non-volatile memory array 142. Non-volatile memory array 142 includes the non-volatile memory cells used to store data. The non-volatile memory cells may be any suitable non-volatile memory cells, including ReRAM, MRAM, PCM, NAND flash memory cells and/or NOR flash memory cells in a two dimensional and/or three dimensional configuration. Non-volatile memory die 104 further includes a data cache 156 that caches data. Peripheral circuitry 141 includes a state machine 152 that provides status information to the controller 102.

Returning again to FIG. 2A, the flash control layer 132 (which will be referred to herein as the flash translation layer (FTL) or, more generally, the "media management layer," as the memory may not be flash) handles flash errors and interfaces with the host. In particular, the FTL, which may be an algorithm in firmware, is responsible for the internals of memory management and translates writes from the host into writes to the memory 104. The FTL may be needed because the memory 104 may have limited endurance, may only be written in multiples of pages, and/or may not be written unless it is erased as a block of memory cells. The FTL understands these potential limitations of the memory 104, which may not be visible to the host. Accordingly, the FTL attempts to translate the writes from host into writes into the memory 104.

The FTL may include a logical-to-physical address (L2P) map (sometimes referred to herein as a table or data structure) and allotted cache memory. In this way, the FTL translates logical block addresses ("LBAs") from the host to physical addresses in the memory 104. The FTL can include other features, such as, but not limited to, power-off recovery (so that the data structures of the FTL can be recovered in the event of a sudden power loss) and wear leveling (so that the wear across memory blocks is even to prevent certain blocks from excessive wear, which would result in a greater chance of failure).

Figure 3:
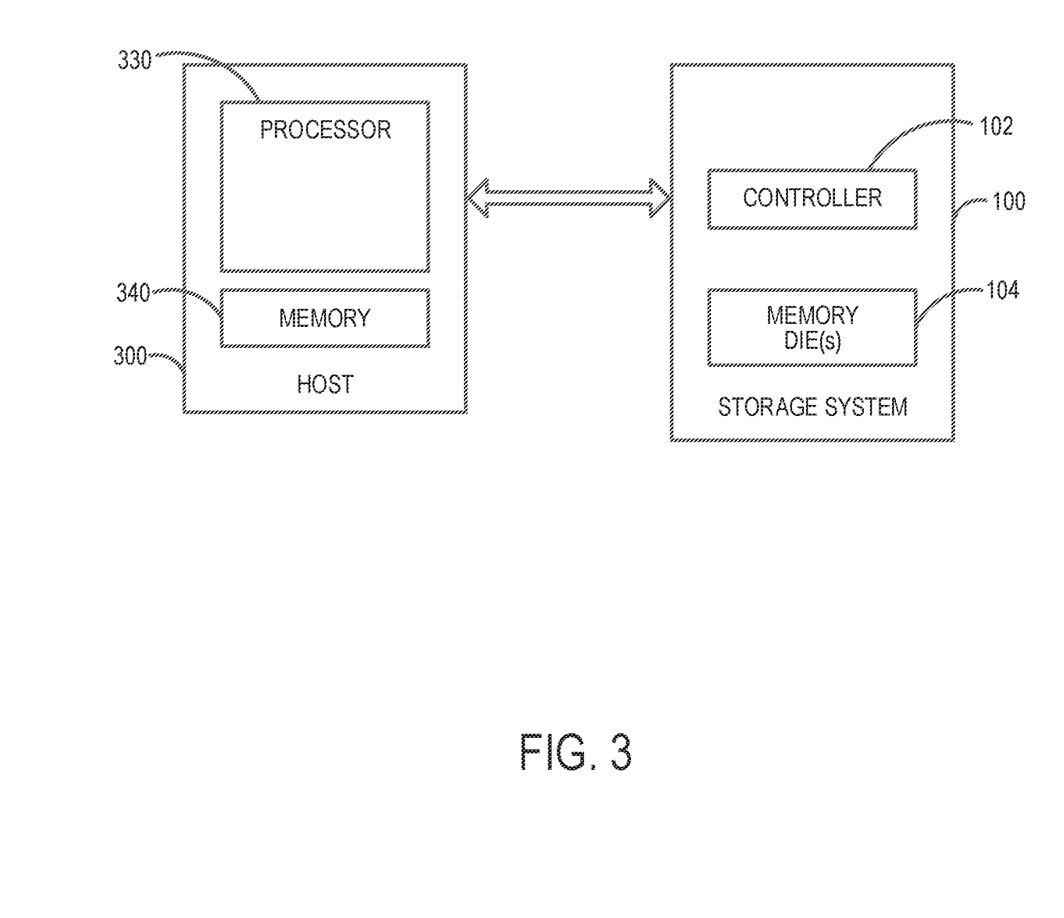
FIG. 3 is a block diagram of a host and a storage system of an embodiment.

Turning again to the drawings, FIG. 3 is a block diagram of a host 300 and storage system (sometimes referred to herein as a device) 100 of an embodiment. The host 300 can take any suitable form, including, but not limited to, a computer, a mobile phone, a digital camera, a tablet, a wearable device, a digital video recorder, a surveillance system, etc. The host 300 comprises a processor 330 that is configured to send data (e.g., initially stored in the host's memory 340 (e.g., DRAM)) to the storage system 100 for storage in the storage system's memory 104 (e.g., non-volatile memory dies). While the host 300 and the storage system 100 are shown as separate boxes in FIG. 3, it should be noted that the storage system 100 can be integrated in the host 300, the storage system 100 can be removably connected to the host 300, and the storage system 100 and host 300 can communicate over a network. It should also be noted that the memory 104 can be integrated in the storage system 100 or removably connected to the storage system 100.

As mentioned above, a memory in a storage system can contain single-level cell (SLC) blocks that store one bit per memory cell and multi-level cell (MLC) blocks that can store more than one bit per memory cell. For example, triple-level cell (TLC) blocks can store three bits per memory cell, and quad-level cell (QLC) blocks can store four bits per memory cell. Because MLC blocks typically take longer to program than SLC blocks and to provide protection against defects that can occur when writing to MLC blocks, data from a host can be written first to SLC blocks and then moved ("folded") into an MLC block. For example, after three SLC blocks have been written, they can be folded into a single TLC block. Similarly, after four SLC blocks have been written, they can be folded into a single QLC block. After the data has been written in the MLC block, the storage system can perform an enhanced post-write read (EPWR) operation to determine if the data was written correctly in the MLC block. If it was, the storage system can release the SLC blocks, so they can be used to store other data.

Figure 4:
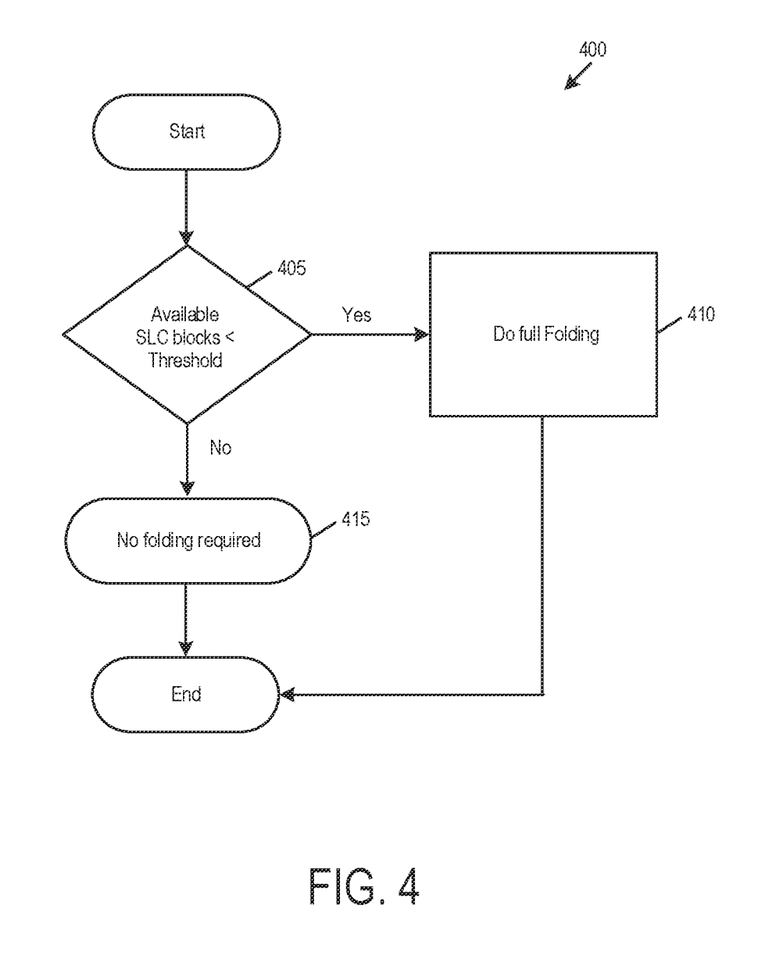
FIG. 4 is a flow chart of a folding operation of an embodiment.
Figure 5:
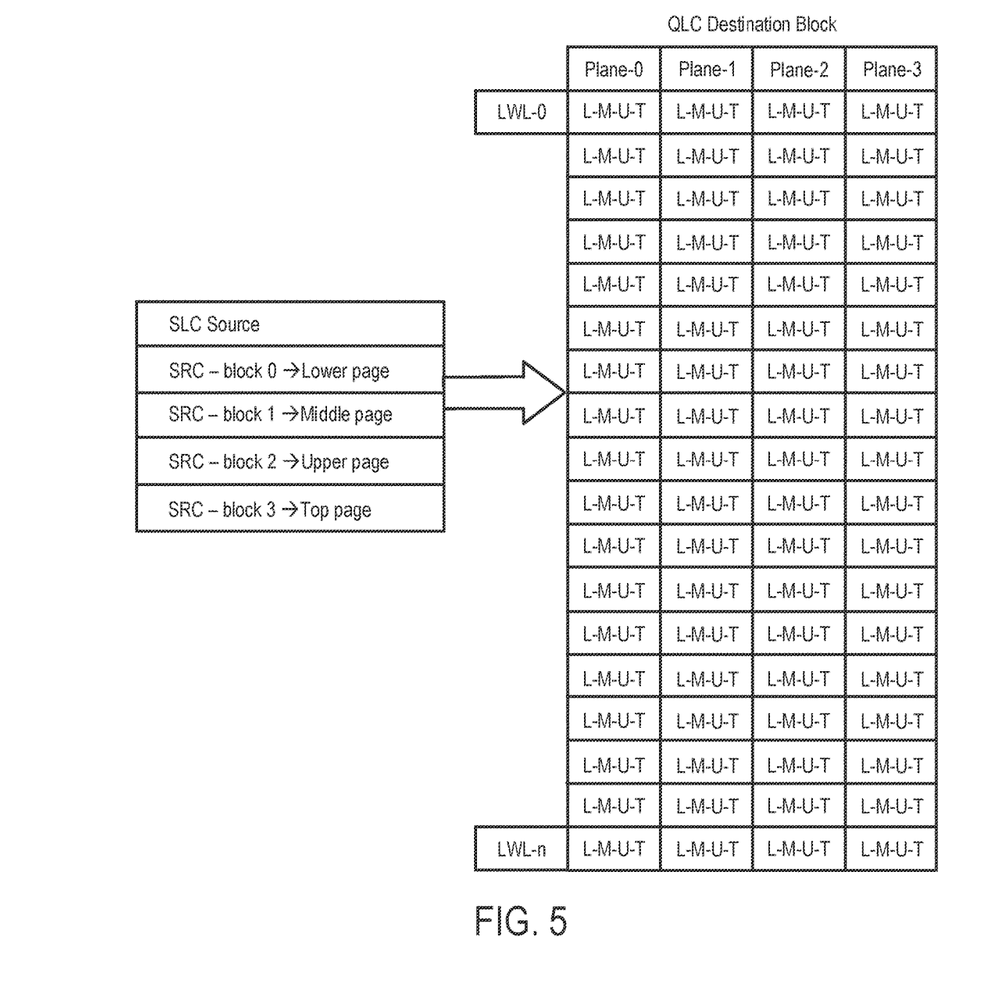
FIG. 5 is an illustration of a folding operation of an embodiment.

FIG. 4 is a flow chart 400 that illustrates this process. As shown in FIG. 4, the controller of the storage system can determine if the number of available SLC blocks is below a threshold (act 405). If the number of available SLC blocks is not below the threshold, no folding is required (act 415) because there are enough SLC blocks to store incoming host data. However, if the number of available SLC blocks is below the threshold, the controller of the storage system performs a full-folding operation (act 410), so that SLC blocks can be released to store incoming host data. For example, if folding is done into a QLC block, the controller would choose four SLC source blocks and move the data stored therein into a single QLC block. This is illustrated in FIG. 5. As shown in FIG. 5, the four SLC blocks are written to lower, middle, upper, and top pages, respectively, of a QLC block. After the write into the QLC block has been verified, the four SLC source blocks can be released, so incoming host data can be written into them.

The folding process can be time-consuming. For example, the folding process can take 10-12 seconds depending on the programming time (tProg) of a QLC block. Because of this delay, the system can run out of SLC blocks for writing incoming host data during an urgent folding operation. Also, this degrades performance by delaying release of the source SLC blocks. A large SLC cache may be required to offset the impact in performance, thereby increasing the SLC block budget requirement.

The following embodiments can be used to address this problem. In general, instead of folding all of the SLC source blocks at once in a single-stage folding operation, a two-stage folding operation is used. For example, in one embodiment, in step one, two source SLC blocks are folded into the lower and middle pages of an entire QLC block. In step two, the next two source SLC blocks are folding into the upper and top pages of same QLC block. (BiCS6 memory supports programming of two pages (lower/middle and upper/top)

separately.) This two-step process can improve performance by releasing source SLC blocks earlier to enable host data to be written to them.

Figure 6A:
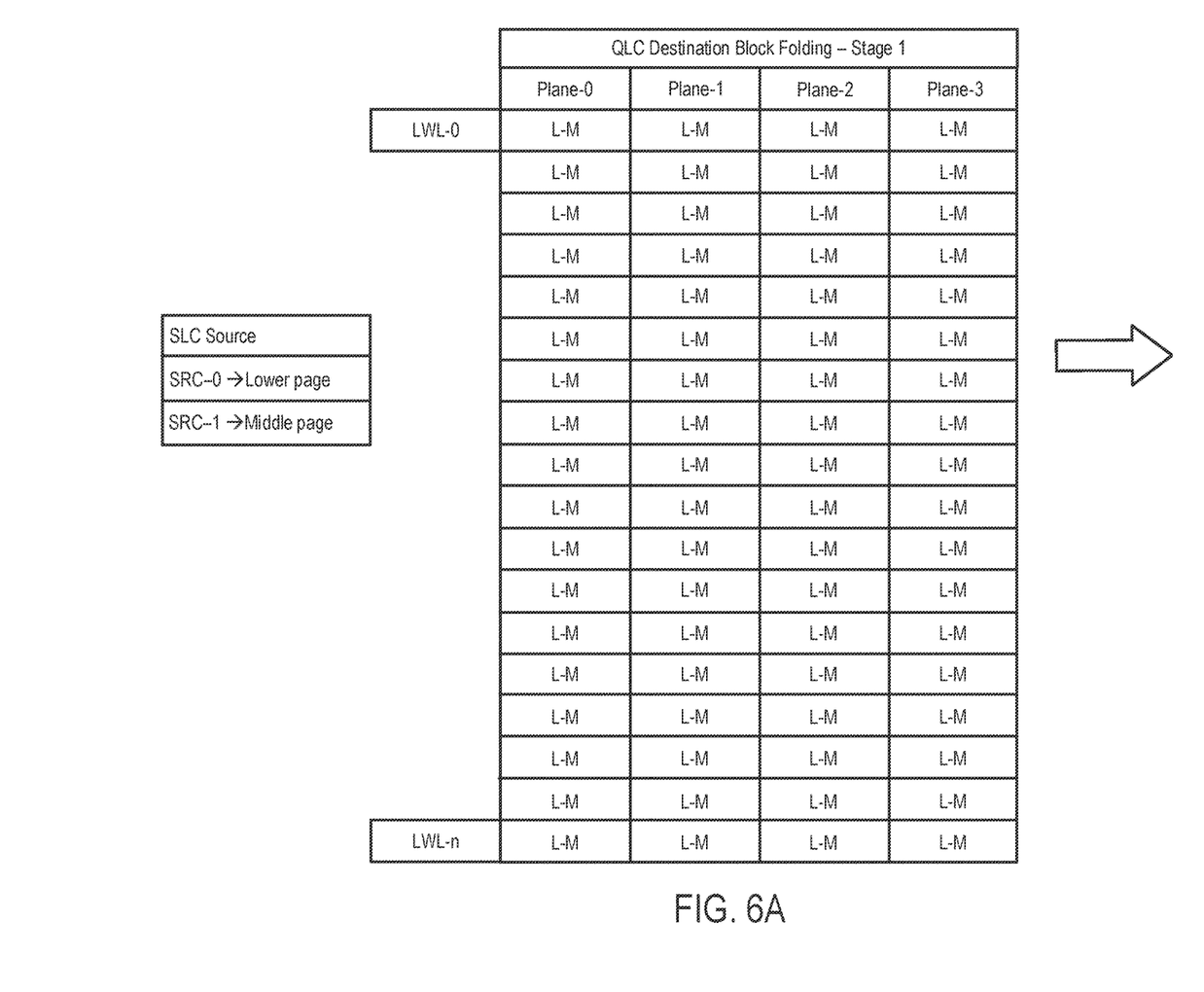
FIGS. 6A and 6B are illustrations of a two-stage folding method of an embodiment.
Figure 6B:
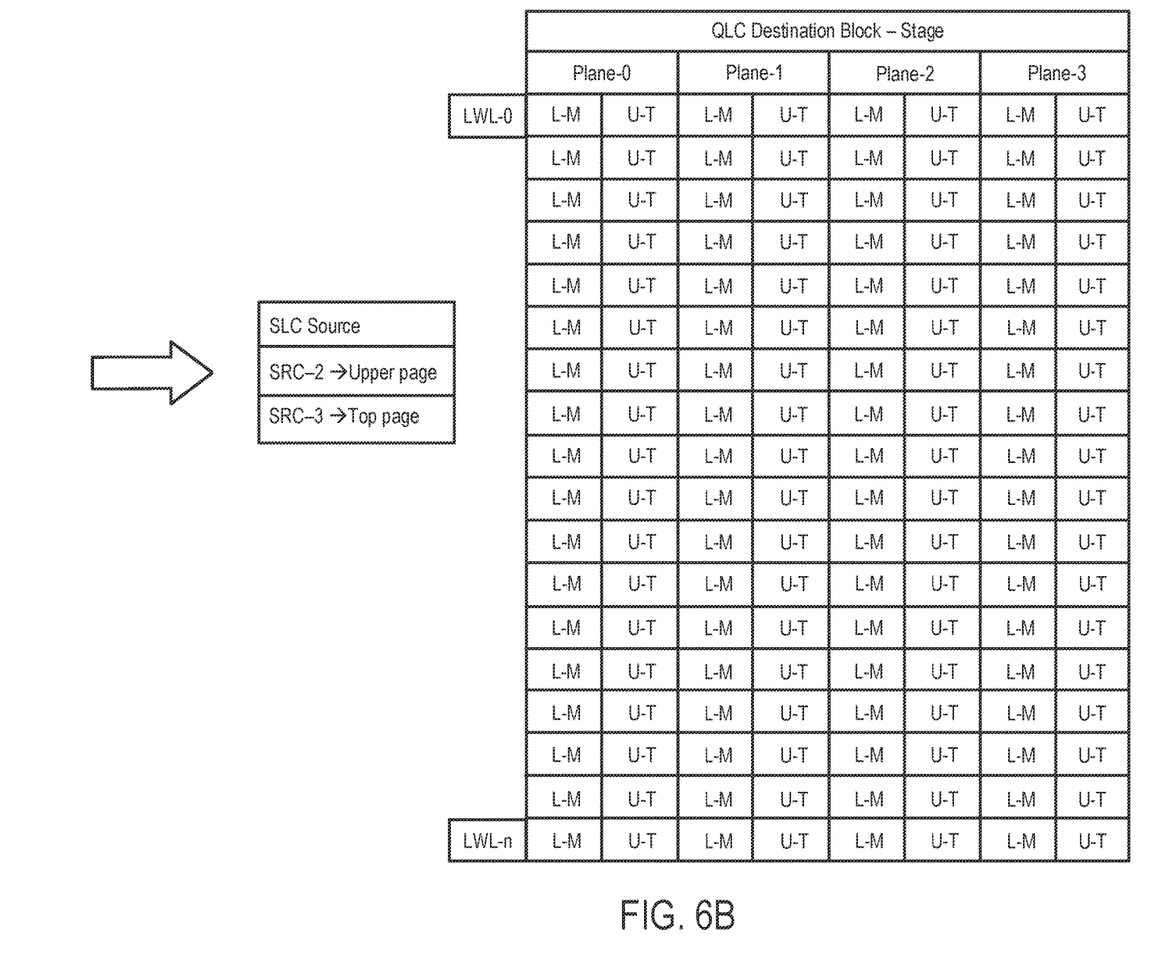
Figure 7:
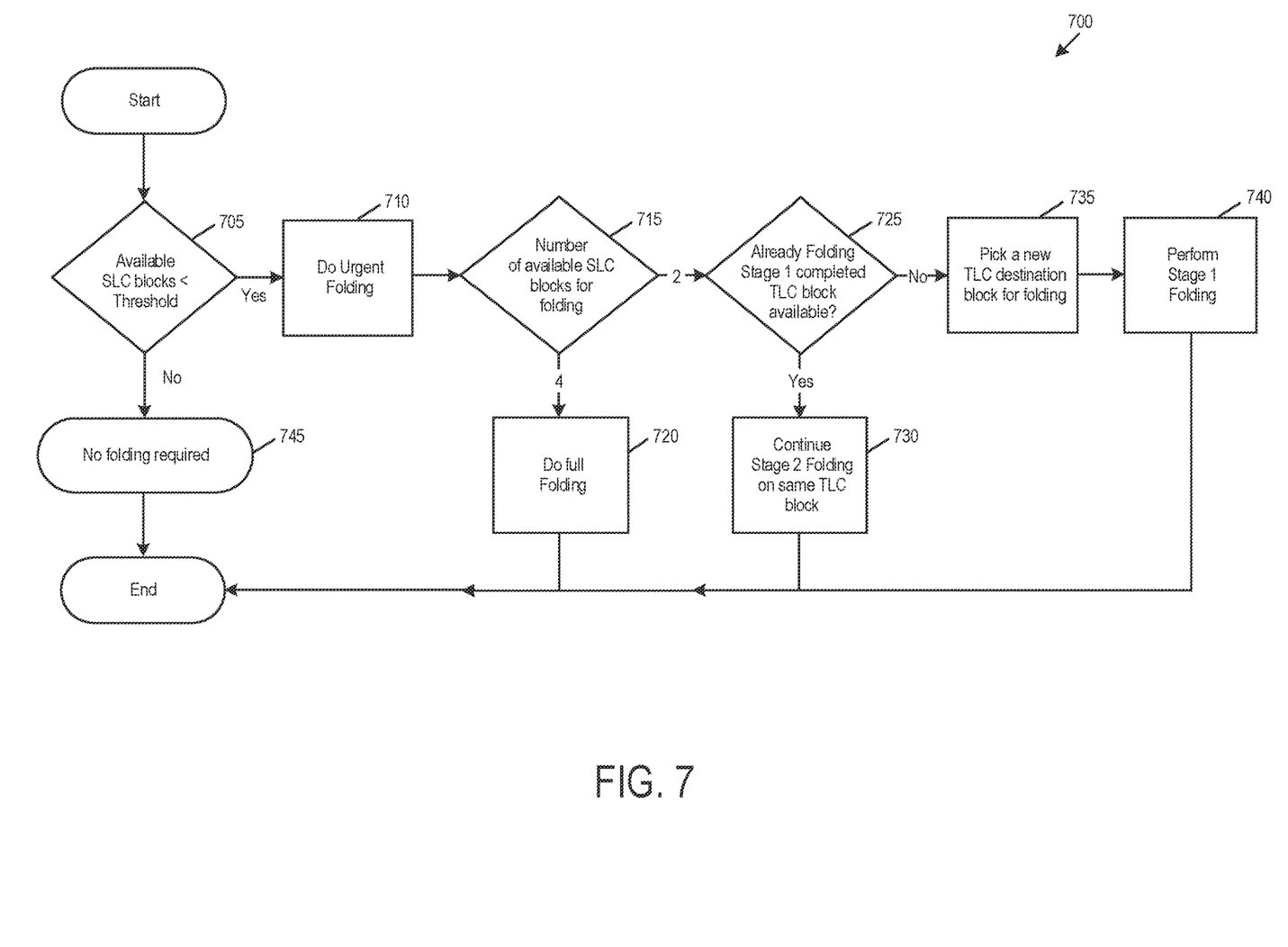
FIG. 7 is a flow chart of a two-stage folding method of an embodiment.

FIGS. 6A and 6B illustrate this two-step folding operation. As shown in FIG. 6A, two SLC source blocks are folded into lower and middle pages of a QLC block. Then, as shown in FIG. 6B, at a later time interval and independent of the programming of the lower and middle pages, another two SLC source blocks are folded into upper and top pages of the QLC block That is, the second step of programming the upper and top pages is sequential in time to the programming of the lower and middle pages (i.e., the second step is sequential to the first step and is not performed in parallel with the first step). FIG. 7 show a flow chart 700 that illustrates this process.

As shown in FIG. 7, the controller 102 of the storage system 100 first determines if the number of available SLC blocks is below a threshold (act 705). If the number of available SLC blocks is not below the threshold, no folding is required (act 745). However, if the number of available SLC blocks is below the threshold, the controller 102 performs an urgent folding operation (act 710). In doing so, the controller 102 determines the number of available blocks for folding (act 715). If four blocks are available, the controller 102 does a full folding operation (act 720). However, if two blocks are available, the controller 102 determines if an already-folded-stage-one TLC block is available (act 725). If the block is available, the controller 102 performs stage two folding on the same TLC block (act 730). However, if the block is not available, the controller 102 picks a new TLC block for folding (act 735) and performs stage one folding (act 740).

In one embodiment, the second stage is performed without reading data written in the first stage and writing it back in the second stage, the first stage is performed irrespective of the validity of the data in the first subset of SLC blocks, and/or the first and second stages are performed sequentially at different times and not in parallel.

There are several advantages associated with these embodiments. For example, by performing this "X4" programming in two independent stages (Stage 1: L-M programming, Stage 2: U-T programming) at two different time intervals, performance of urgent folding scenarios where the storage system runs out of SLC blocks can be enhanced by 50%. More specifically, the L-M programming stage would take 50% as long to program as programming L-M-U-T together. Also, by performing L-M programming for the entire QLC block in the first stage, the two SLC source blocks can be released 50% earlier. This would enable incoming host data to be written to the released source SLC blocks earlier. The U-T programming for the same QLC block with the next two SLC source blocks would occur separately in the second stage.

Also, these embodiments can be used to reduce SLC block budget requirements by ~50%, thereby improving the yield of certain types of memory, such as BinZZ memory. When certain types of memory (e.g., BinZZ memory) are used, a larger SLC block budget may be required to cover memory defects. So, in certain categories of storage system where BinZZ memory is used, there may be a need to enhance the block budget to consume more and more BinZZ memory, thereby increasing yield. These embodiments can address this by reducing the need for a higher SLC block budget, so the same SLC blocks can be used for different complex schemes/other purposes or saved completely. That is, without these embodiments, four SLC blocks would be needed to start the folding process into a QLC block. These embodiments can be used to save two SLC blocks from the SLC block budget, thereby enhancing block budget requirements. This savings can be beneficial (e.g., when BinZZ memory is used) to improve yield.

There are several alternatives that can be used with these embodiments. For example, in the illustration presented above, two SLC blocks were folded into the lower and middle pages of the QLC block in stage one of the folding process, both SLC blocks were released, and then two other SLC blocks were folded into the upper and top pages of the QLC block in stage two of the folding processes. Instead of folding two blocks in stage one and/or stage two, only one block can be written and then released before the second block is written in either or both stages. In this way, one or both of the stages can comprise substages, with the SLC block written in one substage being released before the next substage is performed. For example, in the first stage, the first SLC block can be programmed in the lower and middle pages of the first half of the QLC block as a first sub-stage of the first stage then released before the second SLC block is programmed in the lower and middle pages of the first half of the QLC block in a second sub-stage of the first stage. The third and fourth SLC blocks can then be programmed together in the second stage of the folding operation, as above. Alternatively, the third SLC block can be programmed in the upper and top pages of the second half of the QLC block as a first sub-stage of the second stage then released before the fourth SLC block is programmed in the upper and top pages of the second half of the QLC block in the second sub-stage of the second stage.

Finally, as mentioned above, any suitable type of memory can be used. Semiconductor memory devices include volatile memory devices, such as dynamic random-access memory ("DRAM") or static random access memory ("SRAM") devices, non-volatile memory devices, such as ReRAM, electrically erasable programmable read only memory ("EEPROM"), flash memory (which can also be considered a subset of EEPROM), ferroelectric random access memory ("FRAM"), and MRAM, and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are examples, and memory elements may be otherwise configured.

The semiconductor memory elements located within and/or over a substrate may be arranged in two or three dimensions, such as a two dimensional (2D) memory structure or a three dimensional (3D) memory structure.

In a 2D memory structure, the semiconductor memory elements are arranged in a single plane or a single memory device level. Typically, in a 2D memory structure, memory elements are arranged in a plane (e.g., in an x-z direction plane) that extends substantially parallel to a major surface of a substrate that supports the memory elements. The substrate may be a wafer over or in which the layer of the memory elements is formed or it may be a carrier substrate that is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and wordlines.

A 3D memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate).

As a non-limiting example, a 3D memory structure may be vertically arranged as a stack of multiple 2D memory device levels. As another non-limiting example, a 3D memory array may be arranged as multiple vertical columns (e.g., columns extending substantially perpendicular to the major surface of the substrate, i.e., in the y direction) with each column having multiple memory elements in each column. The columns may be arranged in a 2D configuration, e.g., in an x-z plane, resulting in a 3D arrangement of memory elements with elements on multiple vertically stacked memory planes. Other configurations of memory elements in three dimensions can also constitute a 3D memory array.

By way of non-limiting example, in a 3D NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other 3D configurations can be envisioned wherein some NAND strings contain memory elements in a single memory level while other strings contain memory elements which span through multiple memory levels. 3D memory arrays may also be designed in a NOR configuration and in a ReRAM configuration.

Typically, in a monolithic 3D memory array, one or more memory device levels are formed above a single substrate. Optionally, the monolithic 3D memory array may also have one or more memory layers at least partially within the single substrate. As a non-limiting example, the substrate may include a semiconductor such as silicon. In a monolithic 3D array, the layers constituting each memory device level of the array are typically formed on the layers of the underlying memory device levels of the array. However, layers of adjacent memory device levels of a monolithic 3D memory array may be shared or have intervening layers between memory device levels.

Then again, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic 3D memory arrays. Further, multiple 2D memory arrays or 3D memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that this invention is not limited to the 2D and 3D structures described but cover all relevant memory structures within the spirit and scope of the invention as described herein and as understood by one of skill in the art.

It is intended that the foregoing detailed description be understood as an illustration of selected forms that the invention can take and not as a definition of the invention. It is only the following claims, including all equivalents, which are intended to define the scope of the claimed invention. Finally, it should be noted that any aspect of any of the embodiments described herein can be used alone or in combination with one another.

What is claimed is:

1. A storage system comprising:
   a memory comprising a plurality of single-level cell (SLC) blocks and a multi-level cell (MLC) block; and
   a controller coupled to the memory and configured to fold data stored in the plurality of SLC blocks into the MLC block using a multi-stage process;
   wherein the controller is further configured to:
   perform a first stage of the multi-stage process, wherein in the first stage, a first subset of the plurality of SLC blocks is folded into a first subset of pages of the MLC block; and
   in response to successful completion of the first stage of the multi-stage process:
   perform a second stage of the multi-stage process, wherein in the second stage, a second subset of the plurality of SLC blocks is folded into a second subset of pages of the MLC block, wherein the second stage is performed without reading data written in the first stage and writing it back in the second stage; and
   release the first subset of the plurality of SLC blocks between the first and second stages.

2. The storage system of claim 1, wherein the controller is further configured to perform the first stage irrespective of validity of data in the first subset of SLC blocks.

3. The storage system of claim 1, wherein the first and second stages are performed sequentially at different times and not in parallel.

4. The storage system of claim 1, wherein:
the MLC block comprises a quad-level cell (QLC) block;
in the first stage, two SLC blocks are folded into lower and middle pages of the QLC block; and
in the second stage, two other SLC blocks are folded into upper and top pages of the QLC block.

5. The storage system of claim 1, wherein:
the MLC block comprises a quad-level cell (QLC) block; and
in the first stage, a first SLC block is written into lower and middle pages of the QLC block, then released before a second SLC block is written into the lower and middle pages of the QLC block.

6. The storage system of claim 5, wherein:
in the second stage, a third SLC block is written into upper and top pages of the QLC block, then released before a fourth SLC block is written into the upper and top pages of the QLC block.

7. The storage system of claim 1, wherein:
the MLC block comprises a quad-level cell (QLC) block; and
in the second stage, one SLC block is written into upper and top pages of the QLC block, then released before another SLC block is written into the upper and top pages of the QLC block.

8. The storage system of claim 1, wherein the controller is further configured to fold the data in response to a number of available SLC blocks in the memory being below a threshold.

9. The storage system of claim 1, wherein the controller is further configured to verify that the first subset of the plurality of SLC blocks was successfully written in the first subset of pages of the MLC block before releasing the first subset of the plurality of SLC blocks.

10. The storage system of claim 1, wherein the controller is further configured to release the second subset of the plurality of SLC blocks after the second stage.

11. The storage system of claim 1, wherein the memory comprises a three-dimensional memory.

12. In a storage system comprising a memory comprising a plurality of single-level cell (SLC) blocks and a quad-level cell (QLC) block, a method comprising:
determining how many SLC blocks are available for folding; and
in response to determining that two SLC blocks are available for folding:
determining whether lower and middle pages of the QLC block have been programmed;
in response to determining that the lower and middle pages of the QLC block have not been programmed;
programming the lower and middle pages of the QLC block with the two SLC blocks; and then
in response to the lower and middle pages of the QLC block being programmed successfully:
releasing the two SLC blocks; and then programming upper and top pages of the QLC block; and
in response to determining that the lower and middle pages of the QLC block have been programmed, programming the upper and top pages of the QLC block with the two SLC blocks.

13. The method of claim 12, wherein the upper and top pages of the QLC block are programmed without reading data written in the lower and middle pages of the QLC block and using that data in programming the upper and top pages of the QLC block.

14. The method of claim 12, wherein the lower and middle pages of the QLC block are programmed with the two SLC blocks irrespective of a validity of data stored in the two SLC blocks.

15. The method of claim 12, further comprising:
in response to determining that four SLC blocks are available for folding, fold the four SLC blocks into the QLC block.

16. The method of claim 12, wherein determining how many SLC blocks are available for folding is performed in response to determining that a number of available SLC blocks in the memory is below a threshold.

17. The method of claim 12, wherein the two SLC blocks are released in response to verifying that the lower and middle pages have been successfully written.

18. The storage system of claim 17, further comprising using an enhanced post-write read (EPWR) operation to verify that the lower and middle pages have been successfully written.

19. The method of claim 12, further comprising releasing the two SLC blocks after the upper and top pages have been programmed.

20. A storage system comprising:
a memory comprising a plurality of single-level cell (SLC) blocks and a multi-level cell (MLC) block; and
means for folding data stored in the plurality of SLC blocks into the MLC block using a multi-stage process;
wherein:
in a first stage of the multi-stage process, a first subset of the plurality of SLC blocks is folded into a first subset of pages of the MLC block;
in a second stage of the multi-stage process, which is performed in response to successful completion of the first stage, a second subset of the plurality of SLC blocks is folded into a second subset of pages of the MLC block, wherein the second stage is performed without reading data written in the first stage and writing it back in the second stage; and
the first subset of the plurality of SLC blocks is released between the first and second stages.

* * * * *